(12) United States Patent
Steinberger et al.

(10) Patent No.: US 11,091,019 B2
(45) Date of Patent: Aug. 17, 2021

(54) OFF-AXIS HYBRID MODULE

(71) Applicant: Schaeffler Technologies AG & Co. KG, Herzogenaurach (DE)

(72) Inventors: Markus Steinberger, Macedonia, OH (US); Benjamin Vögtle, Karlsruhe (DE); Gregory Heeke, Wooster, OH (US); Peter Burke, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 417 days.

(21) Appl. No.: 16/131,117

(22) Filed: Sep. 14, 2018

(65) Prior Publication Data

US 2019/0084400 A1   Mar. 21, 2019

Related U.S. Application Data

(60) Provisional application No. 62/560,533, filed on Sep. 19, 2017.

(51) Int. Cl.
| | |
|---|---|
| *F16H 7/02* | (2006.01) |
| *B60K 6/36* | (2007.10) |
| *B60K 6/38* | (2007.10) |
| *B60K 6/405* | (2007.10) |
| *B60K 6/48* | (2007.10) |

(52) U.S. Cl.
CPC .............. *B60K 6/36* (2013.01); *B60K 6/38* (2013.01); *B60K 6/405* (2013.01); *B60K 6/48* (2013.01); *F16H 7/02* (2013.01); *B60K 2006/4825* (2013.01)

(58) Field of Classification Search
CPC .... F16H 7/02; B60K 6/36; B60K 6/38; B60K 6/405; B60K 2006/4825

USPC ........................................................... 74/661
See application file for complete search history.

(56) References Cited

U.S. PATENT DOCUMENTS

| | | | | |
|---|---|---|---|---|
| 6,258,001 | B1 * | 7/2001 | Wakuta | B60K 6/405 475/5 |
| 7,244,208 | B2 * | 7/2007 | Bauknecht | F16H 3/663 475/5 |
| 9,447,726 | B2 | 9/2016 | Hemphill | |
| 9,458,928 | B2 * | 10/2016 | Kawakami | F16H 37/022 |
| 10,017,044 | B2 | 7/2018 | Lahr et al. | |
| 2007/0021259 | A1 * | 1/2007 | Tenberge | F16H 37/0846 475/5 |
| 2009/0054203 | A1 | 2/2009 | Heeke | |
| 2010/0144487 | A1 * | 6/2010 | Noboru | B60K 6/48 477/39 |
| 2012/0073281 | A1 * | 3/2012 | Hirose | B60K 6/543 60/439 |
| 2012/0234135 | A1 * | 9/2012 | Oki | B60K 6/383 74/665 A |

(Continued)

OTHER PUBLICATIONS

International Search Report for PCT/US2018/050994; 10 pgs; dated Jan. 3, 2019 by Korean Intellectual Property Office.

*Primary Examiner* — Ha Dinh Ho

(57) ABSTRACT

A hybrid module for a vehicle includes a damper, a pulley, a clutch, and a torque converter. The damper is arranged for fixing to a crank shaft of an engine. The pulley circumscribes the damper and is arranged for connecting to an electric motor via a belt drive. The clutch has a first output flange for drivingly engaging the damper with the pulley. The torque converter has a pilot drivingly engaged with the first output flange.

16 Claims, 4 Drawing Sheets

(56) References Cited

U.S. PATENT DOCUMENTS

| | | |
|---|---|---|
| 2012/0290158 A1* | 11/2012 | Yoshikawa ............ B60W 20/40 701/22 |
| 2013/0008759 A1 | 1/2013 | Kasuya et al. |
| 2013/0231836 A1 | 9/2013 | Moseler |
| 2014/0352492 A1 | 12/2014 | Nefcy et al. |
| 2016/0091001 A1 | 3/2016 | Chamaken Kamde et al. |
| 2017/0136866 A1 | 5/2017 | Forssell et al. |
| 2018/0015817 A1 | 1/2018 | Samie et al. |

* cited by examiner

OFF-AXIS HYBRID MODULE

FIELD

The invention relates generally to a hybrid module, and more specifically to an off-axis hybrid module.

BACKGROUND

Hybrid modules are known. Examples are shown in U.S. Pat. No. 10,017,044 to Lahr et al. and United States Patent Application Publication No. 2018/0015817 to Samie et al.

BRIEF SUMMARY

Example embodiments broadly comprise a hybrid module for a vehicle including a damper, a pulley, a clutch, and a torque converter. The damper is arranged for fixing to a crank shaft of an engine. The pulley circumscribes the damper and is arranged for connecting to an electric motor via a belt drive. The clutch has a first output flange for drivingly engaging the damper with the pulley. The torque converter has a pilot drivingly engaged with the first output flange. In some example embodiments, the damper has a helical spring, a first drive plate, a second drive plate, and a rivet. The first drive plate has a first orifice for receiving a bolt to fix the damper to the crank shaft, and a second orifice. The second drive plate has a third orifice. The second drive plate at least partially circumscribes the helical spring. The rivet is installed in the second orifice and the third orifice to fix the first drive plate to the second drive plate.

In an example embodiment, one of the first drive plate or the second drive plate has an inner circumferential wall and the other of the first drive plate or the second drive plate has an outer toroidal wall. The damper has a seal installed between the inner circumferential wall and the outer toroidal wall. In an example embodiment, the hybrid module has a drive flange. The damper has a second output flange, the clutch has a friction ring, and the drive flange is drivingly engaged with the second output flange and the friction ring.

In some example embodiments, the clutch has a pressure plate and a friction ring clampable between the first output flange and the pressure plate. In an example embodiment, the first output flange comprises an orifice and at least a portion of the pressure plate passes through the orifice. In an example embodiment, the clutch has a backing plate fixed to the first output flange, and a spring installed between the backing plate and the pressure plate to clamp the friction ring and close the clutch.

In some example embodiments, the hybrid module has a slave cylinder for displacing the pressure plate to open the clutch, and a housing with a hydraulic port in fluid communication with the slave cylinder. In some example embodiments, the hybrid module has a release bearing and a pressing plate installed in a force path between the slave cylinder and the pressure plate. In an example embodiment, the first output flange has an orifice and at least a portion of the pressing plate passes through the orifice.

In an example embodiment, the hybrid module has a housing and a bearing. The bearing is installed radially between the torque converter and the housing. The pilot is installed in the bearing. The torque converter is centered by the bearing.

Other example embodiments broadly comprise a hybrid module with a pulley, a torque converter, and a damper. The pulley is arranged for driving connection to an electric motor. The torque converter is drivingly engaged with the pulley. The damper is arranged for fixing to an engine crankshaft. The damper installed in a power flow between the engine crankshaft and the pulley. In some example embodiments, the torque converter has a pilot with a first spline, the pulley has an output flange with a second spline, complementary to the first spline, and the pilot is drivingly engaged with the output flange. In an example embodiment, the first spline is an external spline and the second spline is an internal spline.

In an example embodiment, the hybrid module has a housing and a bearing disposed radially between the pilot and the housing. The bearing is arranged to radially position the torque converter in the housing. In an example embodiment, the output flange is axially retained on the pilot.

In some example embodiments, the hybrid module has a friction clutch for releasably connecting the pulley to the damper. In an example embodiment, the friction clutch has a spring for engaging the friction clutch and a slave cylinder for releasing the friction clutch.

BRIEF DESCRIPTION OF THE DRAWINGS

The nature and mode of operation of the present invention will now be more fully described in the following detailed description taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1:
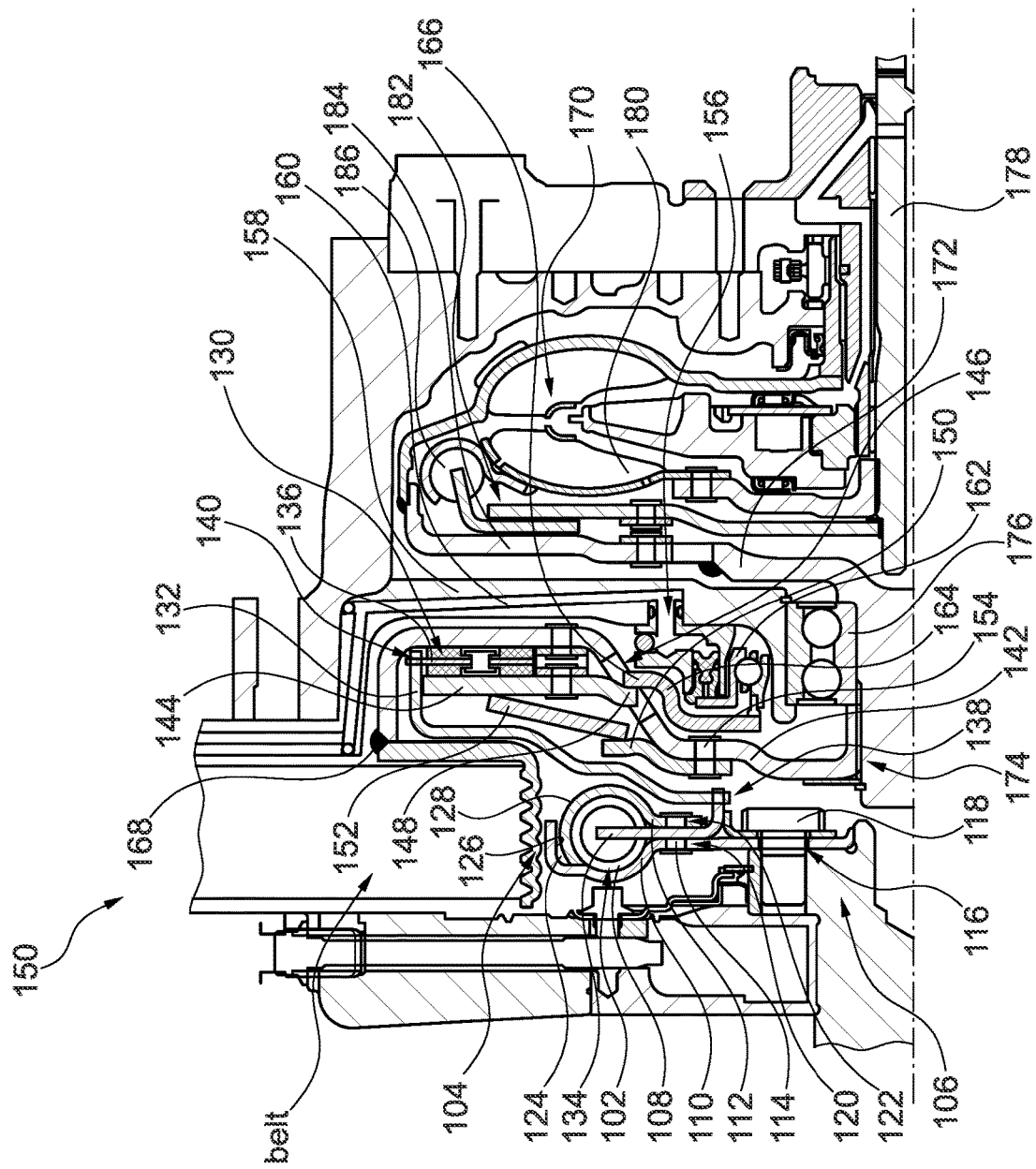
FIG. 1 is a cross-section view of a hybrid module according to an example aspect.

The following description is made with reference to FIG. 1. FIG. 1 is a cross section view of hybrid module 100. Hybrid module 100 includes damper 102 and pulley 104. The damper is arranged for fixing to crank shaft 106 of an engine (not shown) and the pulley circumscribes the damper. The pulley receives a belt for driving connection to an off-axis electric motor (not shown). Damper 102 includes helical spring 108, drive plate 110, drive plate 112, and rivet 114. Drive plate 110 includes orifice 116 for receiving bolt 118 to fix the damper to the crank shaft. Plate 110 also includes orifice 120. Drive plate 112 partially circumscribes the spring and includes orifice 122. Rivet 114 is installed in orifices 120 and 122 to fix drive plates 110 and 112 together. Damper 102 further comprises seal 124. Drive plate 110 includes inner circumferential wall 126. Drive plate 112 includes outer toroidal wall 128. The seal is installed between the inner circumferential wall and the outer toroidal wall.

Hybrid module 100 includes clutch 130 for drivingly engaging the damper with the pulley. Hybrid module 100 includes drive flange 132. The damper includes output flange 134, the clutch includes friction ring 136, and the drive flange is drivingly engaged with the output flange and the friction ring. The drive flange may engage the output flange and friction ring at overlapping spline areas 138 and 140, for example.

Clutch 130 includes output flange 142 and pressure plate 144. The friction ring is clampable between the output flange and the pressure plate. Output flange 142 includes orifice 146 and portion 148 of the pressure plate passes through the orifice. Clutch 130 includes backing plate 150 and spring 152. The backing plate is fixed to the output flange by rivet 154, for example, and the spring is installed between the backing plate and the pressure plate to clamp the friction ring and close the clutch.

Hybrid module 100 includes slave cylinder, or hydrostatic actuator, 156 for displacing the pressure plate to open the clutch. Hybrid module 100 includes housing 158 with hydraulic port 160 in fluid communication with the slave cylinder. Hybrid module 100 includes release bearing 162 and pressing plate 164 installed in a force path between the slave cylinder and the pressure plate. Portion 166 of the pressing plate passes through the orifice 146 in output flange 142. Output flange 142 is fixed to the pulley at weld 168, for example.

Hybrid module 100 includes torque converter 170. The output flange is drivingly engaged with the torque converter. The torque converter includes pilot 172 and the output flange is drivingly engaged with the pilot at spline 174, for example. Hybrid module 100 includes bearing 176. The torque converter is centered by bearing 176 installed radially between the torque converter and the housing. The torque converter pilot is installed in the bearing. Torque converter 170 is arranged for driving connection with transmission input shaft 178 via turbine 180. Clutch 182 can be engaged to connect the turbine to housing 184 through damper 186 as is known to those skilled in the art.

Figure 2:
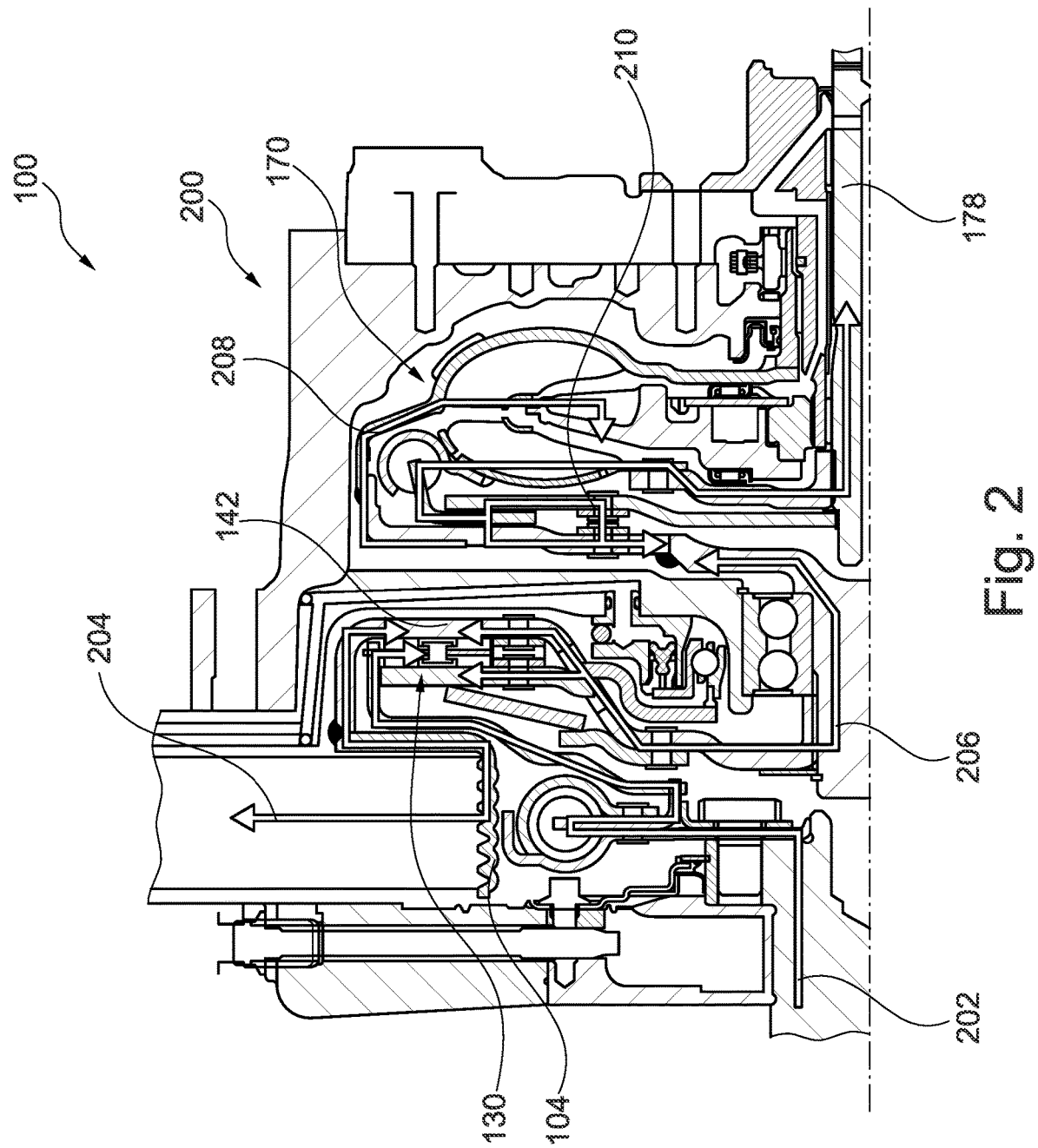
FIG. 2 is a cross-section view of the hybrid module of FIG. 1 showing a torque path with a disconnect clutch engaged.

FIG. 2 is a cross-section view of hybrid module 100 of FIG. 1 showing torque path 200 with disconnect clutch 130 engaged. Torque path 200 includes segments 202 from crankshaft 106 to friction ring 136 and segment 204 from pulley 104 to output flange 142. With the clutch engaged, the paths combine into segment 206, entering converter 170 and exiting to transmission input shaft 178 through path 208 or path 210, depending on an operating state of clutch 182.

Figure 3:
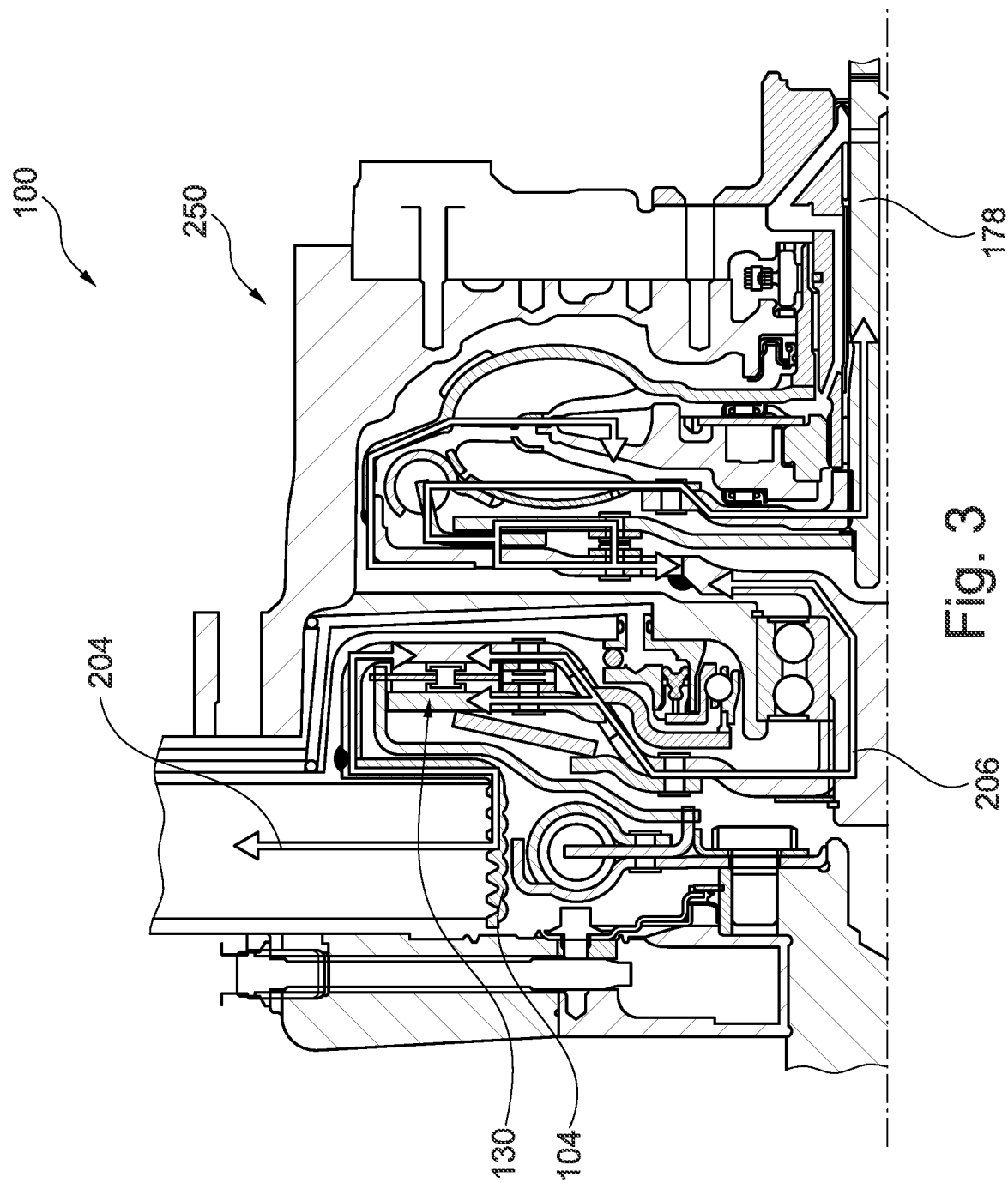
FIG. 3 is a cross-section view of the hybrid module of FIG. 1 showing a torque path with a disconnect clutch disengaged.

FIG. 3 is a cross-section view of hybrid module 100 of FIG. 1 showing torque path 250 with disconnect clutch 130 disengaged. With the clutch disengaged, torque path 202 (not shown) does not combine with 204 such that segment 204 and 206 are equal and the input shaft 178 only receives torque from an electric motor (not shown) via pulley 104. That is, the internal combustion engine is disconnected from the torque flow when the disconnect clutch is not engaged.

Figure 4:
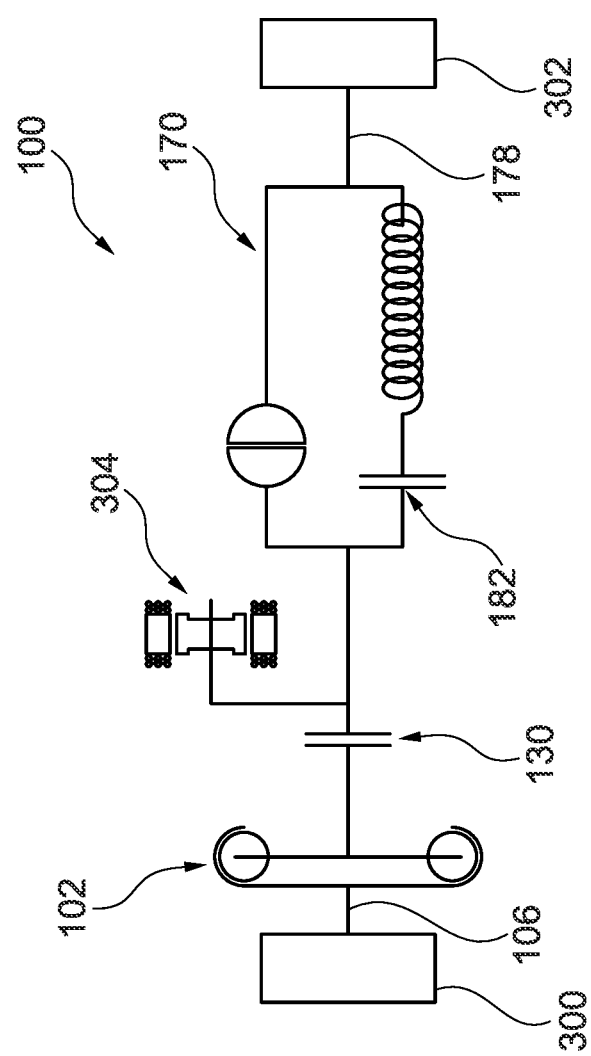
FIG. 4 is a schematic view of the hybrid module of FIG. 1.

FIG. 4 is a schematic view of hybrid module 100 of FIG. 1. Module 100 is shown installed with crankshaft 106 of engine 300 and transmission input shaft 178 of transmission 302. Module 100 includes torque converter 170 with clutch 182. Engine 300 provides power to module 100 in parallel to electric motor 304 depending on an operating position of clutch 130 as described above.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

LIST OF REFERENCE NUMERALS

100 Hybrid module
102 Damper
104 Pulley
106 Crank shaft
108 Helical spring
110 Drive plate
112 Drive plate
114 Rivet (drive plates)
116 Orifice (drive plate 110)
118 Bolt (damper to crank shaft)
120 Orifice (drive plate 110)
122 Orifice (drive plate 112)
124 Seal
126 Inner circumferential wall (drive plate 110)
128 Outer toroidal wall (drive plate 112)
130 Clutch
132 Drive flange
134 Output flange (damper)
136 Friction ring
138 Spline area (output flange)
140 Spline area (friction ring)
142 Output flange (clutch)
144 Pressure plate
146 Orifice (flange 142)
148 Portion (pressure plate)
150 Backing plate
152 Spring
154 Rivet (backing plate to output flange)
156 Slave cylinder
158 Housing
160 Hydraulic port
162 Release bearing
164 Pressing plate
166 Portion (pressing plate)
168 Weld (flange to pulley)
170 Torque converter
172 Pilot
174 Spline
176 Bearing
178 Input shaft
180 Turbine
182 Clutch
184 Housing
186 Damper

What we claim is:
1. A hybrid module for a vehicle comprising:
a damper arranged for fixing to a crank shaft of an engine;
a pulley circumscribing the damper, the pulley arranged for connecting to an electric motor via a belt drive;
a clutch comprising a first output flange fixed to the pulley for drivingly engaging the damper with the pulley; and,
a torque converter comprising a pilot drivingly engaged with the first output flange.

2. The hybrid module of claim 1 wherein the damper comprises:
a helical spring;
a first drive plate comprising:
a first orifice for receiving a bolt to fix the damper to the crank shaft; and,
a second orifice;
a second drive plate including a third orifice, the second drive plate at least partially circumscribing the helical spring; and,
a rivet installed in the second orifice and the third orifice to fix the first drive plate to the second drive plate.

3. The hybrid module of claim 2 wherein:
one of the first drive plate or the second drive plate comprises an inner circumferential wall;
the other of the first drive plate or the second drive plate comprises an outer toroidal wall; and,
the damper comprises a seal installed between the inner circumferential wall and the outer toroidal wall.

4. The hybrid module of claim 1 further comprising a drive flange, wherein:
the damper comprises a second output flange;
the clutch comprises a friction ring; and,
the drive flange is drivingly engaged with the second output flange and the friction ring.

5. The hybrid module of claim 1 wherein the clutch comprises:
a pressure plate; and,
a friction ring clampable between the first output flange and the pressure plate.

6. The hybrid module of claim 5 wherein the first output flange comprises an orifice and at least a portion of the pressure plate passes through the orifice.

7. The hybrid module of claim 5 wherein the clutch comprises:
a backing plate fixed to the first output flange; and,
a spring installed between the backing plate and the pressure plate to clamp the friction ring and close the clutch.

8. The hybrid module of claim 5 further comprising:
a slave cylinder for displacing the pressure plate to open the clutch; and,
a housing with a hydraulic port in fluid communication with the slave cylinder.

9. The hybrid module of claim 8 further comprising a release bearing and a pressing plate installed in a force path between the slave cylinder and the pressure plate.

10. The hybrid module of claim 9 wherein the first output flange comprises an orifice and at least a portion of the pressing plate passes through the orifice.

11. The hybrid module of claim 1 further comprising a housing and a bearing, wherein:
the bearing is installed radially between the torque converter and the housing;
the pilot is installed in the bearing; and,
the torque converter is centered by the bearing.

12. A hybrid module comprising:
a pulley arranged for driving connection to an electric motor;
a torque converter drivingly engaged with the pulley; and
a damper arranged for fixing to an engine crankshaft, the damper installed in a power flow between the engine crankshaft and the pulley, wherein
the torque converter comprises a pilot with a first spline;
the pulley comprises an output flange with a second spline, complementary to the first spline; and,
the pilot is drivingly engaged with the output flange.

13. The hybrid module of claim 12 wherein the first spline is an external spline and the second spline is an internal spline.

14. The hybrid module of claim 12 further comprising:
a housing; and,
a bearing disposed radially between the pilot and the housing, the bearing arranged to radially position the torque converter in the housing.

15. The hybrid module of claim 12 wherein the output flange is axially retained on the pilot.

16. A hybrid module comprising:
a pulley arranged for driving connection to an electric motor;
a torque converter drivingly engaged with the pulley;
a damper arranged for fixing to an engine crankshaft, the damper installed in a power flow between the engine crankshaft and the pulley; and
a friction clutch for releasably connecting the pulley to the damper, the friction clutch comprising a spring for engaging the friction clutch and a slave cylinder for releasing the friction clutch.

* * * * *